US011390740B2

(12) United States Patent
Sunaga

(10) Patent No.: US 11,390,740 B2
(45) Date of Patent: Jul. 19, 2022

(54) POLYACETAL RESIN COMPOSITION AND METHOD FOR PRODUCING THE SAME

(71) Applicant: MITSUBISHI GAS CHEMICAL COMPANY, INC., Tokyo (JP)

(72) Inventor: Daisuke Sunaga, Mie (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 158 days.

(21) Appl. No.: 17/079,974

(22) Filed: Oct. 26, 2020

(65) Prior Publication Data

US 2021/0040310 A1    Feb. 11, 2021

Related U.S. Application Data

(62) Division of application No. 16/302,404, filed as application No. PCT/JP2017/018762 on May 19, 2017, now abandoned.

(30) Foreign Application Priority Data

May 19, 2016 (JP) ................ 2016-100827

(51) Int. Cl.
| | |
|---|---|
| C08J 3/20 | (2006.01) |
| C08L 59/00 | (2006.01) |
| C08K 5/00 | (2006.01) |
| C08K 5/20 | (2006.01) |
| C08K 5/134 | (2006.01) |
| C08K 5/3492 | (2006.01) |
| C08K 5/16 | (2006.01) |
| C08K 5/13 | (2006.01) |

(52) U.S. Cl.
CPC .............. *C08L 59/00* (2013.01); *C08K 5/005* (2013.01); *C08K 5/13* (2013.01); *C08K 5/134* (2013.01); *C08K 5/16* (2013.01); *C08K 5/20* (2013.01); *C08K 5/3492* (2013.01); *C08K 5/34922* (2013.01)

(58) Field of Classification Search
CPC .................. C08L 59/00; C08K 5/20
See application file for complete search history.

(56) References Cited

U.S. PATENT DOCUMENTS

| | | | |
|---|---|---|---|
| 5,458,839 | A | 10/1995 | Murao et al. |
| 5,500,477 | A | 3/1996 | Reuschel et al. |
| 2008/0161488 | A1 | 7/2008 | Ratnagiri |
| 2010/0087575 | A1 | 4/2010 | Shimoda |
| 2011/0184098 | A1 | 7/2011 | Sunaga |

FOREIGN PATENT DOCUMENTS

| | | |
|---|---|---|
| CN | 101583666 A | 11/2009 |
| CN | 101981122 A | 2/2011 |
| EP | 1 522 554 | 4/2005 |
| JP | 5-156118 A | 6/1993 |
| JP | 5-301271 A | 11/1993 |
| JP | 6-199972 A | 7/1994 |
| JP | H09-278983 A | 10/1997 |
| JP | 2000-159850 A | 6/2000 |
| JP | 2005-112995 A | 4/2005 |
| JP | 2005-263927 A | 9/2005 |
| JP | 2008-031348 A | 2/2008 |
| JP | 2010-514898 A | 5/2010 |
| JP | 2012-246337 A | 12/2012 |
| JP | 2013-032453 A | 2/2013 |
| WO | 2004/058875 A1 | 7/2004 |
| WO | 2008/085478 A1 | 7/2008 |

OTHER PUBLICATIONS

International Search Report in WIPO Patent Application No. PCT/JP2017/018762, dated Aug. 22, 2017.
European Search Report, European Patent Office, Application No. 17799493.6, dated Apr. 3, 2019, 9pages.
Notice of Reasons for Refusal, Japanese Patent Application No. 2018-518369, dated Apr. 23, 2021, English translation.

*Primary Examiner* — Wenwen Cai
(74) *Attorney, Agent, or Firm* — Greenblum & Bernstein, P.L.C.

(57) ABSTRACT

The purpose of the present invention is to provide: a polyacetal resin composition which is excellent in terms of impact resistance, thermal stability, and releasability; and a process for producing the polyacetal resin composition. The polyacetal resin composition comprises 100 parts by mass of a polyacetal resin (A) in which the molecular chain has neither a crosslink nor a branch therein, 0.01-10.0 parts by mass of an antioxidant (B), 0.01-5.0 parts by mass of a nitrogenous compound (C), and 0.05-1.0 parts by mass of a fatty acid amide (D), and has a melt index, as measured in accordance with ISO 1133, of 0.5-1.5 g/10 min. A process for producing the polyacetal resin compositions is also provided.

9 Claims, No Drawings

POLYACETAL RESIN COMPOSITION AND METHOD FOR PRODUCING THE SAME

This is a divisional application of U.S. patent application Ser. No. 16/302,404, which is the U.S. National Phase application of International Application No. PCT/JP2017/018762, filed on May 19, 2017, which claims the benefit of Japanese Patent Application No. 2016-100827, filed on May 19, 2016, the contents of which are expressly incorporated by reference herein in their entireties.

TECHNICAL FIELD

The present invention relates to a polyacetal resin composition and a method for producing such compositions.

BACKGROUND ART

Polyacetal resins, which have well-balanced properties such as mechanical properties, thermal properties, electrical properties, sliding properties and molding properties, are used widely as structural materials and mechanism parts such as electrical devices, automobile parts and precision machine parts. One of the performances often required in these applications is an improvement in toughness indicated by impact resistance or tensile elongation. Further, polyacetal resins are easy to mold and are therefore used in the production of complex-shaped molded articles by, for example, injection molding. Thus, enhanced thermal stability and releasability in the molding process are sometimes required.

A known approach to improving toughness is to add thermoplastic polyurethanes or elastomers to polyacetal resins. On the other hand, techniques have been reported which impart high toughness to polyacetal resins without use of modifiers such as elastomers. Specifically, a molding material has been reported which includes a linear polyoxymethylene copolymer and a conventional additive and has a melt flow index (MFI, 190° C., 2.16 kg load) of not more than 0.8 g/10 minutes (see, for example, Patent Literature 1). It has been also reported that a polyoxymethylene copolymer resin which has a melt flow index of 0.1 to 2.0 g/10 minutes and has a substantially linear molecular structure, or a composition of such a resin, exhibits an enhanced melt tension, and an extrusion molded article obtained using such a material attains excellent mechanical properties and cutting processability (see, for example, Patent Literature 2). Further, a polyacetal molded body for cutting processing that exhibits outstanding machinability has been reported, wherein the polyacetal molded body is obtained by molding a polyacetal resin composition including 100 parts by weight of a polyacetal copolymer obtained by polymerizing trioxane with 0.1 to 10 wt % of cyclic ether and/or cyclic formal as a comonomer and 0.1 to 3 wt % of diglycidyl compound, 0.01 to 5 parts by weight of one, or two or more kinds of compounds selected from nitrogen-containing compounds, fatty acid ester compounds and metal-containing compounds, and 0.01 to 5.0 parts by weight of a hindered phenol-based compound, wherein the polyacetal resin composition has a melt index of 0.01 to 5.0 g/10 minutes (see, for example Patent Literature 3).

CITATION LIST

Patent Literature

Patent Literature 1: Japanese Patent Application Kokai Publication No. H6-199972

Patent Literature 2: Japanese Patent Application Kokai Publication No. H5-301271

Patent Literature 3: Japanese Patent Application Kokai Publication No. H5-156118

SUMMARY OF INVENTION

Technical Problem

Patent Literatures 1 and 2 disclose that the impact resistance or melt tension of the polyacetal resins is enhanced, but are silent with respect to thermal stability or releasability. Reproduction of the polymerization of trioxane and dioxolane in the presence of tungstophosphoric acid in accordance with Examples of Patent Literature 1 resulted in a polyacetal resin which showed significantly poor thermal stability. Patent Literature 3 discloses that the polyacetal resin composition has excellent machinability and keeps excellent properties such as mechanical strength and toughness in a well-balanced manner, but this literature does not mention thermal stability or releasability. The composition of Patent Literature 3 has been found to have low toughness indicated by Charpy impact value due to the fact that it includes a polyacetal resin with a crosslinked structure. Further, it has been found that the use of a fatty acid ester in a polyacetal resin composition leads to easy occurrence of slippage in the extrusion step, and the use of a metal-containing compound such as calcium stearate causes significant yellowing and a decrease in thermal stability. As discussed above, the conventional techniques do not explicitly describe an approach to improving releasability, and thus there is need of further improvements for the injection molding applications. Further, the conventional techniques are not satisfactory in terms of thermal stability required for injection molding.

It is therefore an object of the invention to provide a polyacetal resin composition having excellent impact resistance, thermal stability and releasability, and a method for producing such compositions.

Solution to Problem

The present inventors have conducted extensive studies directed to achieving the above object, and have found that outstanding impact resistance, thermal stability and releasability are attained by a polyacetal resin composition which includes a polyacetal resin (A) having a molecular chain with neither crosslinks nor branches, an antioxidant (B), a nitrogen-containing compound (C) and a fatty acid amide (D) and which has a melt index in the specific range as measured in accordance with ISO 1133. The present invention has been completed based on the finding.

Aspects of the present invention reside in the following.

[1] A polyacetal resin composition comprising 100 parts by mass of a polyacetal resin (A) having a molecular chain with neither crosslinks nor branches, 0.01 to 10.0 parts by mass of an antioxidant (B), 0.01 to 5.0 parts by mass of a nitrogen-containing compound (C) and 0.05 to 1.0 part by mass of a fatty acid amide (D), wherein the polyacetal resin composition has a melt index of 0.5 to 1.5 g/10 minutes as measured in accordance with ISO 1133.

[2] The polyacetal resin composition according to [1], which has a Charpy impact value of not less than 10 kJ as measured in accordance with ISO 194.

[3] The polyacetal resin composition according to [1] or [2], wherein the antioxidant (B) is a hindered phenol-based antioxidant.

[4] The polyacetal resin composition according to any one of [1] to [3], wherein the antioxidant (B) is triethylene glycol-bis-3-(3-t-butyl-4-hydroxy-5-methylphenyl) propionate.

[5] The polyacetal resin composition according to any one of [1] to [4], wherein the nitrogen-containing compound (C) is an amino-substituted triazine compound.

[6] The polyacetal resin composition according to any one of [1] to [5], wherein the nitrogen-containing compound (C) is melamine.

[7] The polyacetal resin composition according to any one of [1] to [6], wherein the fatty acid amide (D) is hexamethylenebisstearamide or ethylenebisstearamide.

[8] The polyacetal resin composition according to any one of [1] to [6], wherein the fatty acid amide (D) is ethylenebisstearamide.

[9] A method for producing a polyacetal resin composition according to [1], comprising melt kneading 100 parts by mass of a polyacetal resin (A) having a molecular chain with neither crosslinks nor branches, 0.01 to 10.0 parts by mass of an antioxidant (B), 0.01 to 5.0 parts by mass of a nitrogen-containing compound (C) and 0.05 to 1.0 part by mass of a fatty acid amide (D) at a temperature controlled within the range of not less than 250° C. and not more than 270° C.

[10] The production method according to [9], wherein the melt kneading is performed for not less than 1 minute and not more than 5 minutes.

[11] A molded body comprising the polyacetal resin composition according to any one of [1] to [8].

[12] A part, which is a cut molded body according to [11].

Advantageous Effects of Invention

The polyacetal resin compositions of the present invention have outstanding impact resistance and thus can be used widely as structural materials and mechanism parts such as electrical devices, automobile parts and precision machine parts. Further, the polyacetal resin compositions of the invention have excellent thermal stability and releasability and thus can be suitably used not only for extrusion molding but also for injection molding.

DESCRIPTION OF EMBODIMENTS

The present invention will be described hereinbelow.
<Polyacetal Resins (A)>

The polyacetal resin (A) of the invention is a polymer having an acetal structure: —O—CRH— (wherein R is a hydrogen atom or an organic group) as a repeating unit. The polymer usually has an acetal structure in which R is a hydrogen atom, that is, an oxymethylene group (—OCH$_2$—) as the main structural unit. The polyacetal resin (A) used in the invention may be a copolymer (a block copolymer), a terpolymer or the like which contains one or more kinds of repeating structural units other than the oxymethylene groups, but the polyacetal resin (A) has a molecular chain with neither crosslinks nor branches. Here, the phrase "have a molecular chain with neither crosslinks nor branches" means that the resin has no structural units derived from a monomer capable of forming branches or crosslinks such as, for example, a glycidyl ether compound. That is, the polyacetal resin (A) of the invention is substantially linear. Examples of the structural units other than the oxymethylene groups include $C_{2-10}$ optionally branched oxyalkylene groups such as oxyethylene groups (—OCH$_2$CH$_2$— or —OCH(CH$_3$)—), oxypropylene groups (—OCH$_2$CH$_2$CH$_2$—, —OCH(CH$_3$)CH$_2$— or —OCH$_2$CH(CH$_3$)—), and oxybutylene groups (—OCH$_2$CH$_2$CH$_2$CH$_2$—, —OCH(CH$_3$)CH$_2$CH$_2$—, —OCH$_2$CH(CH$_3$)CH$_2$—, —OCH$_2$CH$_2$CH(CH$_3$)—, —OCH(C$_2$H$_5$)CH$_2$— or —OCH$_2$CH(C$_2$H$_5$)—). In particular, $C_{2-4}$ optionally branched oxyalkylene groups are preferable, and the oxyethylene group (—OCH$_2$CH$_2$—) is particularly preferable. The content of the structural units other than the oxymethylene groups (for example, the oxyalkylene groups) is not particularly limited, but is preferably not less than 0.1 mass % in the polyacetal resin, more preferably not more than 25.0 mass %, and still more preferably not less than 0.5 mass % and not more than 20.0 mass %.

The polyacetal resin (A) of the invention may be produced by any conventional and known method appropriately without limitation. For example, a polyacetal resin (A) having an oxymethylene group and a $C_{2-4}$ oxyalkylene group as structural units may be produced by copolymerizing a cyclic acetal of oxymethylene groups such as formaldehyde trimer (trioxane) or tetramer (tetraoxane) with a cyclic acetal containing a $C_{2-4}$ oxyalkylene group such as ethylene oxide, 1,3-dioxolane, 1,3,6-trioxocane or 1,3-dioxepane. In particular, the polyacetal resin (A) used in the invention is preferably a copolymer of a cyclic acetal such as trioxane or tetraoxane with ethylene oxide or 1,3-dioxolane. A copolymer of trioxane and 1,3-dioxolane is particularly preferable.

For example, the polyacetal resin (A) of the invention may be obtained by the bulk polymerization of a cyclic acetal of oxymethylene groups with a cyclic acetal containing a $C_{2-4}$ oxyalkylene group as a comonomer in the presence of a polymerization catalyst. To deactivate the polymerization catalyst and the polymerization growth ends, a reaction terminator may be used as required. A molecular weight modifier may be used as required in order to control the molecular weight of the polyacetal resin (A). The types and amounts of the polymerization catalyst, reaction terminator and molecular weight modifier which may be used in the production of the polyacetal resin (A) of the invention are not particularly limited as long as the advantageous effects of the invention are not impaired. Any known polymerization catalysts, reaction terminators and molecular weight modifiers may be used appropriately.

Examples of the polymerization catalysts include, although not particularly limited thereto, Lewis acids such as boron trifluoride, tin tetrachloride, titanium tetrachloride, phosphorus pentachloride, phosphorus pentafluoride, arsenic pentafluoride and antimony pentafluoride, as well as complex compounds or salt compounds of these Lewis acids. Examples further include protonic acids such as trifluoromethanesulfonic acid and perchloric acid; esters of protonic acids such as esters of trifluoromethanesulfonic acid or perchloric acid with a lower aliphatic alcohol; and anhydrides of protonic acids such as mixed anhydrides of trifluoromethanesulfonic acid or perchloric acid with other lower aliphatic carboxylic acid. Examples further include triethyloxonium hexafluorophosphate, triphenylmethyl hexafluoroarsenate and acetyl hexafluoroborate. In particular, compounds including boron trifluoride are preferable, and boron trifluoride diethyl etherate and boron trifluoride dibutyl etherate which are coordination complexes with ethers are particularly preferable.

The polymerization catalyst may be used in any amount without limitation. The amount is usually $1.0 \times 10^{-8}$ to $2.0 \times 10^{-3}$ mol per 1 mol of the total of the cyclic acetal of oxymethylene groups and comonomers, and is preferably in the range of $5.0 \times 10^{-8}$ to $8.0 \times 10^{-4}$ mol, and particularly preferably in the range of $5.0 \times 10^{-8}$ to $1.0 \times 10^{-4}$ mol.

Examples of the reaction terminators include, although not particularly limited thereto, trivalent organic phosphorus compounds, amine compounds, and alkali metal or alkaline earth metal hydroxides. The reaction terminators may be used singly, or two or more may be used in combination. In particular, trivalent organic phosphorus compounds, tertiary amines and hindered amines are preferable.

The reaction terminator may be used in any amount without limitation as long as the amount is sufficient to deactivate the polymerization catalyst. The amount is usually in the range of $1.0 \times 10^{-1}$ to $1.0 \times 10^{1}$ in molar ratio relative to the polymerization catalyst.

Examples of the molecular weight modifiers include, although not particularly limited thereto, methylal, methoxymethylal, dimethoxymethylal, trimethoxymethylal and oxymethylene di-n-butyl ether, with methylal being particularly preferable. The amount in which the molecular weight modifier is used is determined appropriately in accordance with the target molecular weight. Usually, the amount is controlled in the range of 0 to 0.1 mass % relative to all the monomers.

The polyacetal resin (A) of the invention preferably has a melt index (MI, 190° C., 2.16 kg load) of 0.5 to 1.5 g/10 minutes as measured in accordance with ISO 1133.

<Antioxidants (B)>

The antioxidant (B) added to the polyacetal resin composition of the invention is not particularly limited as long as it has an antioxidant action on the polyacetal resin. Examples thereof include phenol-based antioxidants and phosphorus-based antioxidants. Of these, phenol-based antioxidants are preferable, and hindered phenol-based antioxidants are particularly preferable. The antioxidants may be used singly, or two or more may be used in combination.

The hindered phenol-based antioxidants are not particularly limited as long as they are the hindered phenol compounds which have an antioxidant action on the polyacetal resins. Examples thereof include 2,2'-methylene-bis(4-methyl-6-t-butylphenol), 4,4'-methylene-bis(2,6-di-t-butylphenol), 1,3,5-trimethyl-2,4,6-tris(3,5-di-t-butyl-4-hydroxybenzyl)benzene, 3,5-di-t-butyl-4-hydroxybenzyl-dimethylamine, distearyl-3,5-di-t-butyl-4-hydroxybenzyl phosphonate, diethyl-3,5-di-t-butyl-4-hydroxybenzyl phosphonate, 2,6,7-trioxa-1-phospha-bicyclo[2.2.2]oct-4-yl-methyl-3,5-di-t-butyl-4-hydroxyhydrocin namate, 3,5-di-t-butyl-4-hydroxyphenyl-3,5-distearyl-thiotriazylamine, 2-(2-hydroxy-3,5-di-t-butylphenyl)-5-chlorobenzotriazole, 2,6-di-t-butyl-4-hydroxymethylphenol, 2,4-bis-(n-octylthio)-6-(4-hydroxy-3,5-di-t-butylanilino)-1,3,5-triazine, N,N'-hexamethylenebis(3,5-di-t-butyl-4-hydroxy-hydrocin-namamide), octadecyl-3-(3,5-di-t-butyl-4-hydroxyphenyl) propionate, 1,6-hexanediol-bis[3-(3,5-di-t-butyl-4-hydroxyphenyl) propionate], pentaerythritol-tetrakis[3-(3,5-di-t-butyl-4-hydroxyphenyl) propionate], triethylene glycol-bis[3-(3,5-dimethyl-4-hydroxyphenyl) propionate], triethylene glycol-bis[3-(3-t-butyl-5-methyl-4-hydroxyphenyl) propionate], triethylene glycol-bis[3-(3,5-di-t-butyl-4-hydroxyphenyl) propionate], and 2,2'-thiodiethyl-bis[3-(3,5-di-t-butyl-4-hydroxyphenyl) propionate]. The hindered phenol compounds may be used singly, or two or more may be used in combination. Of these, 1,3,5-trimethyl-2,4,6-tris(3,5-di-t-butyl-4-hydroxybenzyl)benzene, pentaerythritol-tetrakis[3-(3,5-di-t-butyl-4-hydroxyphenyl) propionate], and triethylene glycol-bis[3-(3-t-butyl-5-methyl-4-hydroxyphenyl) propionate] are preferable, and triethylene glycol-bis[3-(3-t-butyl-5-methyl-4-hydroxyphenyl) propionate] is particularly preferable.

The ratio of the antioxidant (B) is 0.01 to 10.0 parts by mass relative to 100 parts by mass of the polyacetal resin (A), and is preferably 0.05 to 5.0 parts by mass, and particularly preferably 0.1 to 1.0 part by mass. When the ratio of the antioxidant (B) is 0.01 part by mass or above, the desired thermal stability is obtained.

<Nitrogen-Containing Compounds (C)>

Examples of the nitrogen-containing compounds (C) added to the polyacetal resin composition of the invention include, although not particularly limited thereto, polyamide resins, dicarboxylic acid hydrazides and amino-substituted triazine compounds. Of these, amino-substituted triazine compounds are preferable. The nitrogen-containing compounds may be used singly, or two or more may be used in combination.

Examples of the amino-substituted triazine compounds include, although not particularly limited thereto, guanamine, melamine, N-butylmelamine, N-phenylmelamine, N,N-diphenylmelamine, N,N-diallylmelamine, N,N',N"-triphenylmelamine, methylolmelamines such as N,N',N"-trimethylolmelamine, alkylated melamines such as hexamethoxymethylmelamine, benzoguanamine, 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, and ammeline (4,6-diamino-2-hydroxy-1,3,5-triazine). Of these, melamine, methylolmelamine, alkylated melamines and benzoguanamine are preferable, and melamine is particularly preferable.

The ratio of the nitrogen-containing compound (C) is 0.01 to 5.0 parts by mass relative to 100 parts by mass of the polyacetal resin (A), and is preferably 0.03 to 3.0 parts by mass, and particularly preferably 0.05 to 1.0 part by mass. When the ratio of the nitrogen-containing compound (C) is in the above range, the desired thermal stability is obtained, and the polyacetal resin composition attains a low melt index (MI) and good impact resistance (a Charpy impact value). Further, good tensile elongation at break is obtained.

<Fatty Acid Amides (D)>

Examples of the fatty acid amides (D) added to the polyacetal resin composition of the invention include, although not particularly limited thereto, saturated fatty acid amides, unsaturated fatty acid amides, saturated fatty acid bisamides and unsaturated fatty acid bisamides. Of these, saturated fatty acid bisamides are preferable. The fatty acid amides may be used singly, or two or more may be used in combination.

The saturated fatty acid amides or unsaturated fatty acid amides are, for example, amides of saturated or unsaturated fatty acids having 10 to 22 carbon atoms, such as lauramide, palmitamide, stearamide, oleamide and erucamide. The saturated fatty acid bisamides or unsaturated fatty acid bisamides are, for example, reaction products of a $C_{1-6}$ alkylene diamine with a $C_{10-22}$ saturated or unsaturated fatty acid, such as ethylenebiscapramide, ethylenebislauramide, ethylenebisstearamide, ethylenebishydroxystearamide, ethylenebisbehenamide, hexamethylenebisstearamide, hexamethylenebisbehenamide, hexamethylenebishydroxystearamide, ethylenebisoleamide, ethylenebiserucamide and hexamethylenebisoleamide. Of these, reaction products of a $C_{2-6}$ alkylene diamine with a $C_{10-22}$ saturated fatty acid are preferable, hexamethylenebisstearamide and ethylenebisstearamide are more preferable, and ethylenebisstearamide is particularly preferable.

The ratio of the fatty acid amide (D) is 0.05 to 1.0 part by mass relative to 100 parts by mass of the polyacetal resin (A), and is preferably 0.05 to 0.5 part by mass, and particularly preferably 0.1 to 0.5 part by mass. When the ratio of the fatty acid amide (D) is 0.05 part by mass or above, the desired releasability is obtained. When the ratio of the fatty acid amide (D) is 1.0 part by mass or less, the polyacetal resin composition attains good impact resistance.

<Additional Components>

Where necessary, the polyacetal resin composition of the invention may appropriately contain, in addition to the components described hereinabove, additional components such as a variety of additives including stabilizers, nucleating agents, fillers, pigments, lubricants, plasticizers, antistatic agents, UV absorbers, flame retardants and auxiliary flame retardants, other resins and elastomers while still achieving the advantageous effects of the invention.

<Methods for Producing Polyacetal Resin Compositions>

A method for producing a polyacetal resin composition of the present invention comprises melt kneading 100 parts by mass of a polyacetal resin (A) having a molecular chain with neither crosslinks nor branches, 0.01 to 10.0 parts by mass of an antioxidant (B), 0.01 to 5.0 parts by mass of a nitrogen-containing compound (C) and 0.05 to 1.0 part by mass of a fatty acid amide (D) at a temperature controlled within the range of not less than 250° C. and not more than 270° C. The polyacetal resin (A), the antioxidant (B), the nitrogen-containing compound (C) and the fatty acid amide (D) are as described hereinabove. In the production of the polyacetal resin composition, where necessary, the composition may contain the aforementioned additional components in addition to the polyacetal resin (A) having a molecular chain with neither crosslinks nor branches, the antioxidant (B), the nitrogen-containing compound (C) and the fatty acid amide (D).

The polyacetal resin composition of the invention may be produced by mixing the polyacetal resin (A) having a molecular chain with neither crosslinks nor branches, the antioxidant (B), the nitrogen-containing compound (C), the fatty acid amide (D) and optionally the additional components in any order, and melt kneading the mixture. The apparatuses used in the production of the polyacetal resin compositions are not particularly limited, and mixers, kneaders and the like which are conventionally used for the production of resin compositions of this class, may be used.

The melt kneading is performed while controlling the temperature of the polyacetal resin composition inside the kneader within the range of not less than 250° C. and not more than 270° C. More specifically, the melt kneading is particularly preferably performed while controlling the temperature of the apparatus (for example, the jacket temperature) or kneading conditions (for example, the rotational speed of the screw) so that the resin temperature at the exit of the kneader is within the range of not less than 250° C. and not more than 270° C. By controlling the temperature of the polyacetal resin composition inside the kneader in the above range, the melt index of the resultant polyacetal resin composition is brought to the range of 0.5 to 1.5 g/10 minutes as measured in accordance with ISO 1133, and the composition tends to attain excellent impact resistance and also tends to show excellent thermal stability. The melt kneading is preferably performed for not less than 1 minute and not more than 5 minutes. Controlling the melt kneading time in this range brings the melt index of the resultant polyacetal resin composition to the range of 0.5 to 1.5 g/10 minutes as measured in accordance with ISO 1133, and the composition tends to attain excellent impact resistance. In general, the melt kneading of a polyacetal resin composition is carried out at a jacket temperature of 200° C. to 250° C. In this case, the temperature of the polyacetal resin composition inside the kneader becomes far higher than the jacket temperature due to the friction within the molten polyacetal resin composition. In some cases, the temperature of the resin composition (for example, the resin temperature at the exit) exceeds 270° C.

Specifically, the polyacetal resin composition is produced, for example, in such a manner that predetermined amounts of the antioxidant (B), the nitrogen-containing compound (C) and the fatty acid amide (D) are added simultaneously or in any order to the polyacetal resin (A) having a molecular chain with neither crosslinks nor branches, the addition being optionally accompanied by the addition of the additional components, and all the components are mixed together with a device such as a tumbler-type blender. Next, the obtained mixture can be melt kneaded in a twin-screw extruder equipped with a devolatilizing vent so that the temperature of the polyacetal resin composition inside the kneader is within the range of not less than 250° C. and not more than 270° C., and the melt can be extruded into a form of a strand, which is then pelletized to give the polyacetal resin composition having the desired formulation.

<Polyacetal Resin Compositions and Molded Bodies>

The polyacetal resin composition of the invention obtained as described above has a melt index (MI, 190° C., 2.16 kg load) in the range of 0.5 to 1.5 g/10 minutes as measured in accordance with ISO 1133. This range of melt index ensures that the resin composition exhibits excellent impact resistance (a Charpy impact value). The polyacetal resin composition of the invention preferably has a Charpy impact value of not less than 10 kJ as measured in accordance with ISO 194. When the Charpy impact value is 10 kJ or above, the polyacetal resin composition may be suitably used for impact resistant parts such as gear parts subjected to high torque.

The polyacetal resin composition of the invention may be molded in accordance with known polyacetal resin molding methods. For example, the resin composition melt kneaded in an extruder may be directly molded, without being pelletized, into an injection molded article, a blow molded article, an extrusion molded article or the like. Examples of the molded bodies made of the polyacetal resin composition of the invention include, but are not limited to, pellets, round bars, thick plates, sheets, tubes, and cylindrical or tetragonal containers. The molded bodies of the invention may be used in applications where polyacetal resin compositions have been conventionally used, such as various parts of machinery, electrical devices, automobiles, construction materials and the like. The molded bodies may be further worked, for example, cut into industrial parts for use in various fields, in particular, high-grade parts requiring reliability such as electrical or electronic parts and automobile parts.

EXAMPLES

Hereinbelow, embodiments and advantageous effects of the present invention will be described in detail by presenting Examples and Comparative Examples. However, it should not be construed that the scope of the present invention is limited to such Examples.

Polyacetal resin compositions obtained in Examples and Comparative Examples were evaluated by the following methods.

<Melt Index (MI)>

The measurement was performed at 190° C. and 2.16 kg load in accordance with ISO 1133.

<Tensile Elongation at Break>

Test piece molding: Pellets of a polyacetal resin composition obtained in an Example or a Comparative Example were predried at 80° C. for 3 hours, and were thereafter molded into a test piece in accordance with the procedures described in ISO 294-1. The molded test piece was conditioned in a chamber at a temperature of 23±2° C. and a relative humidity of 50±5% for at least 48 hours, and was thereafter subjected to a tensile test.

Tensile characteristics test: The tensile elongation at break (the distance between gauge lines) was measured in accordance with the procedures described in ISO 527-1 and ISO 527-2 at a measurement temperature of 23° C., an initial distance between the gauge lines of 50 mm and a tension rate of 50 mm/minute.

The larger the value of tensile elongation at break, the higher the toughness.

<Charpy Impact Value>

Each of polyacetal resin compositions obtained in Examples and Comparative Examples was molded into a dumbbell-shaped molded piece in accordance with ISO 527 with an injection molding machine having a mold clamping force of 90 tons. The molded piece obtained was worked in accordance with ISO 194 and tested for a Charpy impact value.

<Residence Thermal Stability>

A polyacetal resin composition obtained in an Example or a Comparative Example was molded into a 75×50×5 mm plate-shaped molded piece with an injection molding machine having a mold clamping force of 70 tons. During this process, the composition was retained in a cylinder set at 200° C. and was molded every 12 minutes. The residence time (minutes) when the occurrence of silver streaks (a phenomenon that gas outflow marks is observed in a radial appearance on the surface of the molded piece) was first observed on the surface of the molded piece, was measured.

<Releasability Evaluation: Mold Release Resistance>

Releasability was evaluated in the following manner. Containers in the form of a 30×50×30 mm box having a central rib (box-shaped molded containers) were continuously molded automatically with an injection molding machine PS40 manufactured by NISSEI PLASTIC INDUSTRIAL CO., LTD. The pressure applied to the ejector pin in demolding the box-shaped molded container was measured with a pin-type pressure sensor. The composition was continuously molded in 30 shots. The average of the values of pressure applied to the ejector pin in the 11th to 30th shots was obtained as the mold release resistance (unit: MPa) of each sample of Examples and Comparative Examples.

Polyacetal resins used in Examples and Comparative Examples were produced as described below.

<Production of Polyacetal Resin (A-1)>

A polyacetal resin (A-1) used in Examples and Comparative Examples was produced as follows. A twin-screw continuous polymerizer that had been equipped with a jacket set at 65° C. and a self-cleaning paddle was continuously supplied with 100 parts by mass of trioxane, 4 parts by mass of 1,3-dioxolane and a benzene solution containing 0.025 mmol of boron trifluoride diethyl etherate as a polymerization catalyst per 1 mol of all the monomers (trioxane and 1,3-dioxolane). The polymerization was performed continuously so that the residence time for the raw materials in the polymerizer would be 20 minutes.

To the obtained polymerization reaction product was added a benzene solution containing triphenylphosphine in a molar amount two times that of boron trifluoride diethyl etherate used as a polymerization catalyst. After the polymerization catalyst had been deactivated, the polymer was triturated. A polyacetal resin (A-1) was thus obtained. The yield of the polyacetal resin (A-1) was 95%, and the melt index (MI) was 0.6 g/10 minutes.

<Production of Polyacetal Resin (A-2)>

A polyacetal resin (A-2) used in Comparative Examples was produced as follows. A twin-screw continuous polymerizer that had been equipped with a jacket set at 65° C. and a self-cleaning paddle was continuously supplied with 100 parts by mass of trioxane, 4 parts by mass of 1,3-dioxolane and a benzene solution containing 0.030 mmol of boron trifluoride diethyl etherate as a polymerization catalyst per 1 mol of all the monomers (trioxane and 1,3-dioxolane). The polymerization was performed continuously so that the residence time for the raw materials in the polymerizer would be 20 minutes.

To the obtained polymerization reaction product was added a benzene solution containing triphenylphosphine in a molar amount two times that of boron trifluoride diethyl etherate used as a polymerization catalyst. After the polymerization catalyst had been deactivated, the polymer was triturated. A polyacetal resin (A-2) was thus obtained. The yield of the polyacetal resin (A-2) was 95%, and the melt index (MI) was 2.5 g/10 minutes.

<Production of Polyacetal Resin (A-3)>

A polyacetal resin (A-3) used in Comparative Examples was produced as follows. A twin-screw continuous polymerizer that had been equipped with a jacket set at 65° C. and a self-cleaning paddle was continuously supplied with 100 parts by mass of trioxane, 4 parts by mass of 1,3-dioxolane, 0.7 part by mass of 1,4-butanediol diglycidyl ether, and a benzene solution containing 0.025 mmol of boron trifluoride diethyl etherate as a polymerization catalyst per 1 mol of all the monomers (trioxane, 1,3-dioxolane, and 1,4-butanediol diglycidyl ether). The polymerization was performed continuously so that the residence time for the raw materials in the polymerizer would be 20 minutes.

To the obtained polymerization reaction product was added a benzene solution containing triphenylphosphine in a molar amount two times that of boron trifluoride diethyl etherate used as a polymerization catalyst. After the polymerization catalyst had been deactivated, the polymer was triturated. A polyacetal resin (A-3) was thus obtained. The yield of the polyacetal resin (A-3) was 95%, and the melt index (MI) was 0.6 g/10 minutes.

Other components used in polyacetal resin compositions of Examples and Comparative Examples are described below.

<Antioxidant (B)>

Triethylene glycol-bis-3-(3-t-butyl-4-hydroxy-5-methylphenyl) propionate (Irganox (registered trademark) 245 manufactured by BASF Corporation)

<Nitrogen-Containing Compound (C)>

Melamine (manufactured by Mitsui Chemicals, Inc.)

<Fatty Acid Amide (D-1)>

Ethylenebisstearamide (manufactured by Kao Corporation)

<Fatty Acid Amide (D-2)>

Hexamethylenebisstearamide (manufactured by CHEMICAL LAND 21)

<Fatty Acid Metal Salt (E)>

Calcium stearate (CALCIUM STEARATE S manufactured by NOF CORPORATION)

Polyacetal resin compositions of Examples and Comparative Examples were produced as described below.

Example 1

A polyacetal resin composition of Example 1 was obtained as follows. To 100 parts by mass of the polyacetal resin (A-1) obtained by the aforementioned method were added 0.3 part by mass of Irganox (registered trademark) 245, 0.1 part by mass of melamine and 0.15 part by mass of ethylenebisstearamide. The mixture was continuously extruded from a twin-screw extruder while performing devolatilization under a cylinder temperature of 200° C. and a reduced pressure of 21.3 kPa. Pellets of a polyacetal resin composition were thus obtained. The resin temperature was actually measured at the extruder die exit using a thermocouple thermometer, and was controlled by manipulating the rotational speed of the extruder screw. The residence time for the resin composition was 3 minutes.

The obtained pellets were subjected to the measurements of tensile elongation at break, Charpy impact value, residence thermal stability and mold release resistance by the aforementioned methods. The results are described in Table 1.

Examples 2 to 7, and Comparative Examples 1 and 4 to 7

With a formulation and a resin temperature at the extruder exit described in Table 1, the antioxidant (B), the nitrogen-containing compound (C), and the fatty acid amide (D-1) or (D-2) were added to the polyacetal resin (A-1), (A-2) or (A-3) obtained by the aforementioned method, and the mixture was continuously extruded from a twin-screw extruder while performing devolatilization under a cylinder temperature of 200° C. and a reduced pressure of 21.3 kPa. Pellets of a polyacetal resin composition were thus obtained, respectively. The resin temperature was actually measured at the extruder die exit using a thermocouple thermometer, and was controlled by manipulating the rotational speed of the extruder screw. The residence time for the resin composition was 3 minutes.

The obtained pellets were subjected to the measurements of tensile elongation at break, Charpy impact value, residence thermal stability and mold release resistance by the aforementioned methods. The results are described in Table 1.

Comparative Example 2

Pellets of a polyacetal resin composition were obtained in the same manner as in Example 1, except that the fatty acid amide (D) was replaced by calcium stearate as the fatty acid metal salt (E). The resin temperature was actually measured at the extruder die exit using a thermocouple thermometer, and was controlled by manipulating the rotational speed of the extruder screw. The residence time for the resin composition was 3 minutes. The obtained pellets were subjected to the measurements of tensile elongation at break, Charpy impact value, residence thermal stability and mold release resistance by the aforementioned methods. The results are described in Table 1.

Comparative Example 3

Pellets of a polyacetal resin composition were obtained in the same manner as in Example 1, except that the fatty acid amide (D) was not added. The resin temperature was actually measured near the extruder die exit using a thermocouple thermometer, and was controlled by manipulating the rotational speed of the extruder screw. The residence time for the resin composition was 3 minutes. The obtained pellets were subjected to the measurements of tensile elongation at break, Charpy impact value, residence thermal stability and mold release resistance by the aforementioned methods. The results are described in Tables 1 and 2.

TABLE 1

|  | Unit | Example 1 | Example 2 | Example 3 | Example 4 | Example 5 | Example 6 | Example 7 |
|---|---|---|---|---|---|---|---|---|
| Polyacetal resin (A-1) | phr | 100 | 100 | 100 | 100 | 100 | 100 | 100 |
| Polyacetal resin (A-2) | phr | | | | | | | |
| Polyacetal resin (A-3) | phr | | | | | | | |
| Antioxidant(B) | phr | 0.3 | 0.3 | 0.3 | 0.3 | 0.3 | 0.3 | 0.3 |
| Nitrogen-containing compound(C) | phr | 0.1 | 0.1 | 0.1 | 0.1 | 0.1 | 0.1 | 0.1 |
| Fatty acid amide(D-1) | phr | 0.15 | 0.3 | 0.15 | 0.15 | 0.5 | 0.9 | |
| Fatty acid amide(D-2) | phr | | | | | | | 0.15 |
| Fatty acid metal salt(E) | phr | | | | | | | |
| Resin temperature at extruder exit | ° C. | 250 | 257 | 260 | 268 | 260 | 260 | 266 |
| MI of Resin composition (MI of pellets) | g/10 minutes | 0.8 | 0.8 | 1.2 | 0.8 | 0.8 | 0.8 | 0.9 |
| Tensile elongation at break | % | 45.9 | 46.1 | 46.7 | 44.9 | 45.0 | 40.5 | 43.2 |
| Charpy impact value | kJ | 13.5 | 13.5 | 13.5 | 13.0 | 12.5 | 12.0 | 10.5 |
| Residence of thermal stability (200° C.) | minutes | 72 | 72 | 72 | 72 | 72 | 72 | 72 |
| Mold release resistance | MPa | 3.2 | 3.4 | 3.3 | 3.3 | 3.4 | 3.8 | 4.3 |

A-1: a linear polyacetal resin (MI of the resin: 0.6 g/10 minutes)
A-2: a linear polyacetal resin (MI of the resin: 2.5 g/10 minutes)
A-3: a crosslinked polyacetal resin
B: triethylene glycol-bis|3-(3-t-butyl-4-hydroxy-5-methylphenyl) propionate|
C: melamine
D-1: ethylenebisstearamide
D-2: hexamethylenebisstearamide
E: calcium stearate

TABLE 2

| | Unit | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Polyacetal resin (A-1) | phr | 100 | 100 | 100 | 100 | | | |
| Polyacetal resin (A-2) | phr | | | | | 100 | 100 | |
| Polyacetal resin (A-3) | phr | | | | | | | 100 |
| Antioxidant(B) | phr | 0.3 | 0.3 | 0.3 | 0.3 | 0.3 | 0.3 | 0.3 |
| Nitrogen-containing compound(C) | phr | 0.001 | 0.1 | 0.1 | 0.1 | 0.1 | 0.1 | 0.1 |
| Fatty acid amide(D-1) | phr | 0.15 | | | 0.15 | 0.15 | 0.9 | 0.15 |
| Fatty acid amide(D-2) | phr | | | | | | | |
| Fatty acid metal salt(E) | phr | | 0.15 | | | | | |
| Resin temperature at extruder exit | ° C. | 260 | 264 | 260 | 285 | 260 | 260 | 260 |
| MI of Resin composition (MI of pellets) | g/10 minutes | 1.6 | 1.0 | 0.8 | 2.5 | 2.7 | 2.7 | 0.8 |
| Tensile elongation at break | % | 32.6 | 37.6 | 43.5 | 34.3 | 34.0 | 30.5 | 34.3 |
| Charpy impact value | kJ | 9.0 | 13.0 | 13.0 | 8.3 | 8.0 | 7.5 | 9.9 |
| Residence of thermal stability (200° C.) | minutes | 36 | 12 | 72 | 36 | 72 | 72 | 36 |
| Mold release resistance | MPa | 3.6 | 4.8 | 6.5 | 4.0 | 3.7 | 4.1 | 4.0 |

A-1: a linear polyacetal resin (MI of the resin: 0.6 g/10 minutes)
A-2: a linear polyacetal resin (MI of the resin: 2.5 g/10 minutes)
A-3: a crosslinked polyacetal resin
B: triethylene glycol-bis[3-(3-t-butyl-4-hydroxy-5-methylphenyl) propionate]
C: melamine
D-1: ethylenebisstearamide
D-2: hexamethylenebisstearamide
E: calcium stearate

INDUSTRIAL APPLICABILITY

The polyacetal resin compositions of the present invention have outstanding impact resistance and thus can be used widely as structural materials and mechanism parts such as electrical devices, automobile parts and precision machine parts. Further, the polyacetal resin compositions of the invention have excellent thermal stability and releasability and thus can be suitably used not only for extrusion molding but also for injection molding.

What is claimed is:

1. A method for producing a polyacetal resin composition, comprising:
    mixing 100 parts by mass of a polyacetal resin (A) having a molecular chain with neither crosslinks nor branches, 0.01 to 10.0 parts by mass of an antioxidant (B), 0.01 to 5.0 parts by mass of a nitrogen-containing compound (C), and 0.05 to 1.0 part by mass of a fatty acid amide (D), to obtain a mixture; and
    melt kneading the mixture with a kneader to obtain the polyacetal resin composition, so that the polyacetal resin composition has a melt index of 0.5 to 1.5 g/10 minutes as measured in accordance with ISO 1133, wherein the temperature of the polyacetal resin composition at the exit of the kneader is controlled within the range of not less than 250° C. and not more than 270° C.

2. The method according to claim 1, wherein the polyacetal resin composition has a Charpy impact value of not less than 10 Id as measured in accordance with ISO 194.

3. The method according to claim 1, wherein the antioxidant (B) is a hindered phenol-based antioxidant.

4. The method according to claim 1, wherein the antioxidant (B) is triethylene glycol-bis-3-(3-t-butyl-4-hydroxy-5-methylphenyl) propionate.

5. The method according to claim 1, wherein the nitrogen-containing compound (C) is an amino-substituted triazine compound.

6. The method according to claim 1, wherein the nitrogen-containing compound (C) is melamine.

7. The method according to claim 1, wherein the fatty acid amide (D) is hexamethylenebisstearamide or ethylenebisstearamide.

8. The method according to claim 1, wherein the fatty acid amide (D) is ethylenebisstearamide.

9. The method according to claim 1, wherein the melt kneading is performed for not less than 1 minute and not more than 5 minutes.

* * * * *

UNITED STATES PATENT AND TRADEMARK OFFICE
CERTIFICATE OF CORRECTION

PATENT NO. : 11,390,740 B2
APPLICATION NO. : 17/079974
DATED : July 19, 2022
INVENTOR(S) : D. Sunaga It is certified that error appears in the above-identified patent and that said Letters Patent is hereby corrected as shown below:

In the Claims

At Column 14, Line 35 (Claim 2, Line 3), please change "Id" to -- kJ --.

Signed and Sealed this
Seventeenth Day of January, 2023

Katherine Kelly Vidal
*Director of the United States Patent and Trademark Office*